Feb. 18, 1969  P. L. DECROUEZ  3,428,780

ELECTRIC IRON

Filed Jan. 11, 1966  Sheet 1 of 4

INVENTOR:
PIERRE L. DECROUEZ
BY Howson & Howson
ATTYS.

United States Patent Office 3,428,780
Patented Feb. 18, 1969

3,428,780
ELECTRIC IRON
Pierre L. Decrouez, Swarthmore, Pa., assignor, by mesne assignments, to Proctor-Silex Incorporated, Philadelphia, Pa., a corporation of New York
Filed Jan. 11, 1966, Ser. No. 519,863
U.S. Cl. 219—256       18 Claims
Int. Cl. D06f 15/28

ABSTRACT OF THE DISCLOSURE

An electric iron is provided having a heating element with terminals and a handle with a socket having the terminals therein. An electric cord extends into a connector which is positionable in the socket. Wires of the cord are connected to terminal means supported by the connector, the terminal means being adapted to contact the terminals of the heating element. Releasable latch means is supported by the handle for engaging and holding the connector in the socket, whereby upon release of the latch means the connector can be removed from the socket and reversed in position to cause the cord to extend to either side of the handle.

---

The present invention relates to an electric iron, and more particularly, to improvements in means whereby the electric cord supplying current to the heating element may be removed from the iron and/or reversed to cause the cord to extend selectively to either side of the iron.

In using electric irons there are many instances in which it is desirable to be able to have the ironing cord extend selectively to either side of the handle of the iron. Also, it is desirable in many instances to be able to easily and safely remove the cord from the iron after use. The removal of the cord is especially desirable in storage of the iron to avoid insecure placement of the iron on a shelf and to avoid having the cord extending rigidly from the iron or wrapped around the iron. Wrapping of a permanently attached cord around an iron before a time delay for cooling of the iron can result in burning of the hands or fingers if they touch the iron and can also result in scorching the cord. Also, it is desirable to have the cord removable from the iron for ease of manipulation of the iron when not in use.

In the prior art, electrical irons have been constructed with a cord which is detachable from the iron but these irons have not been adapted for having the cord removable and/or reversed to extend selectively to either side of the iron. Further, in these prior art arrangements the detachment of the cord from the iron has not been as easy as desired since the cord attachment has been by a friction fit through a plug-type connector.

Prior art irons have been designed with ironing cords which are permanently attached to the iron but reversible to extend selectively to either side of the iron. However, such arrangements have not been entirely satisfactory since the cords are not readily detachable from the iron for ease of storage after use and have not eliminated the problems associated with wrapping the cord around the iron. Furthermore, changing the cord from one side to the other has required the use of tools for removal and reinstallation of some part. In addition, these arrangements have not been as simple and inexpensive as desirable.

Accordingly, it is an object of the present invention to provide a new and useful connector for attaching an ironing cord to an iron and one which is removable from the iron so that the connector may be reversed to cause the cord to extend selectively to either side of the iron.

Another object is to provide such a connector which is capable of being releasably attached to the handle of an iron enabling easy removal and replacement of the connectors without the use of tools.

A further object is to provide such a connector with contacts which are spring biased for resilient connection to the terminals of the iron such that upon release of latch means releasably holding the connector to the iron the contacts of the connector will spring free of the terminals of the iron.

It is also an object to provide such a connector that may be manipulated easily with one hand for attachment or removal of the connector from the iron.

A further object is to provide a connector for attachment of an electric cord to the iron which is suitable to form a part of the handle of the iron to avoid an unsightly or bulky appearance.

Still another object is to provide such a connector for an electric cord which is durable for easy and trouble-free operation and which is inexpensive to manufacture and assemble.

It is still a further object to provide such a connector which is releasably latched to the handle of the iron and such a connector which upon release of the latch will be urged free of the handle breaking the electrical connection.

In accordance with the present invention, these and other objects are achieved by providing a new and improved connector for attaching an electric cord to an iron with novel features which cooperate to acocmplish these objectives. The invention is employed with an electric iron having a body portion provided with an electrical resistance heating element which has a pair of terminals for receiving electrical current. The iron has a handle with a rear leg provided with a socket. The terminals of the heating element extend into the socket in the rear leg. An electric cord having a pair of wires for supplying electrical current is terminated in a connector to electrically connect the cord to the terminals of the heating element. The connector in the preferred form of the invention has a first opening in one end into which the cord extends and a second opening in a plug portion positionable in the socket. The cord is so arranged that when the plug portion is positioned in the socket the cord will extend from the connector to one side of the rear leg. A pair of electrical terminal means are supported and suitably spaced by an insulating portion of the connector and are electrically connected to the respective wires of the cord. When the connector plug portion is positioned in the socket the terminal means in the connector are arranged so that each contacts a different terminal of the heating element which extends into the connector through the second opening in the plug portion of the connector.

Preferably, a releasable latch means is supported by the handle and is alternatively movable along a predetermined path into and out of position to hold the connector in its socket in the handle when the connector is in that position. It is preferred to bias the latch means to overlie a portion of the connector to hold the connector fixed in the socket and to manually release the latch means. The latch means may be released and the connector removed from and replaced in the handle reversed in the socket so that the cord extends to the opposite side of the rear leg.

In the preferred embodiment of the connector the terminal means each comprise a resilient contact arm supported by the connector and biased to oppose placing in position the connector with its contact arms bearing against the terminals of the heating element. When the latch means holding the connector in place is released, the resilient contact arms of the connector urge the connector out of the socket disconnecting the contact arms from the terminals of the heating element, in which condition the connector may be easily removed from the socket.

For a better understanding of these and other features and advantages of the present invention, reference is made to the following detailed description and the accompanying drawings, in which.

Figure 1:
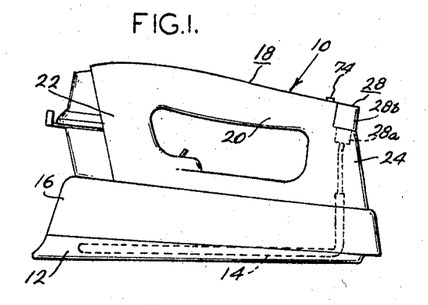
FIG. 1 is a side elevational view of an electric iron in accordance with a preferred form of the present invention.
Figure 2:
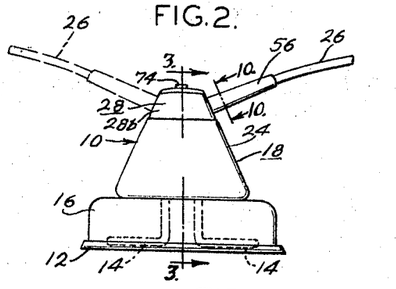
FIG. 2 is a rear elevational view of the iron of FIG. 1 showing the connector for the ironing cord in alternative positions for having the cord extend to opposite sides of the iron.
Figures 3, 4, 5, 6:
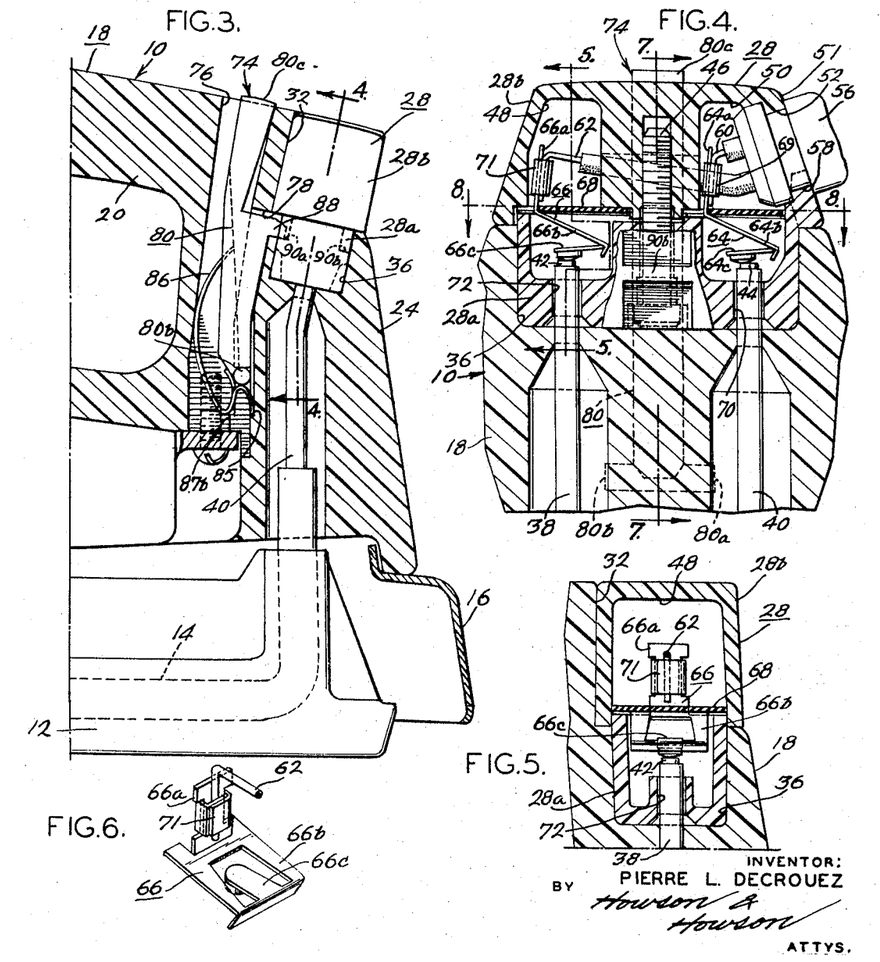
FIG. 3 is a fragmentary sectional view of the rear portion of the iron taken along line 3—3 of FIG. 2.
FIG. 4 is a fragmentary sectional view taken along line 4—4 of FIG. 3.
FIG. 5 is a fragmentary sectional view taken along line 5—5 of FIG. 4.
FIG. 6 is a perspective view of the terminal element with its resilient contact arm of FIG. 5.

Referring particularly to FIGS. 1, 2 and 3, an electric iron generally designated 10 is shown having a soleplate 12 with a heating element generally designated 14 embedded therein and shown in phantom. Ordinarily the heating element is U-shaped with its bight adjacent the top of the soleplate and its legs extending rearwardly adjacent the side edges of the soleplate. The heating element may also be a unit as shown in United States Patent No. 2,880,531, entitled "Flatiron," of R. H. Houck and assigned to the common assignee. Preferably, the terminal construction is similar to that shown in that application but extending higher above the soleplate in the manner discussed herein. A sheet metal housing or shell 16 extends above the periphery of the soleplate and is surmounted by a handle 18 of a molded resinous material. The soleplate, shell and handle are connected together by any convenient attachment means such as screws. Handle 18 comprises a generally horizontally extending hand-grip portion 20, a front leg 22 and a rear leg 24. The rear leg 24 and housing 16 fit together in overlapping relation with the housing formed to fit within a downwardly extending flange of the rear leg so that utensils cannot be wedged between the rear leg and housing to contact the terminals.

An electric cord 26 is provided for supplying electrical current to the heating element and is connected to the iron, and preferably to the handle, by a connector generally designated 28 which is suitable for being removed from the iron and reversed in position to cause the cord to extend selectively to either side of the rear leg of the iron, as shown by the alternative position of the cord in FIG. 2.

More particularly, as seen in FIGS. 3 and 4, connector 28 has a plug portion 28a which is received in a socket generally designated 32 formed in rear leg 24 in the course of molding the handle providing an opening just below the top of the rear leg. Socket 32 is adapted to receive a mating portion of the connector and the connector in this position is designed to complete the smooth contour of the handle. To this end a portion of the handle extending across the entire width is omitted in molding and is provided by the connector. This socket comprises an upwardly opening cavity 36 extending across the width of leg 24. The cavity 36 has sidewalls which guide the plug portion of the connector into the socket and has a bottom which is closed except for openings which permit the upwardly extending terminal posts 38 and 40 attached at the ends of the heating element to enter the cavity from hollow portions of the rear leg below the bottom. Terminal posts 38 and 40 extend upwardly into the cavity 36 and are surmounted by precious metal contact points 42 and 44, respectively, which are attached by any convenient means to the ends of the terminal posts.

In the preferred embodiment of the connector 28, as shown in FIGS. 3 and 4, the connector when positioned in socket 32 conforms to the shape of the top and sides of the handle to form a usable part of the handle, as, for example, a resting surface for the palm of a hand. As shown in FIGS. 4, 5, 7, 11 and 12, the connector is composed of a two-piece unit of molded resinous material comprising a top inverted trough-shaped portion designated 28b and bottom trough-shaped plug portion designated 28a of reduced cross-sectional dimensions to fit within the sidewalls of top 28b. The top and bottom of the connector each have a vertically oriented central web which is aligned with the other to divide the connector into compartments 48 and 50. The top and bottom portions of the connector are made to fit together, the bottom being snugly received within the top and abutting a shoulder so that any convenient means such as self-threading screw 46 may be used to hold them together.

Figures 7, 8, 9, 10, 11, 12:
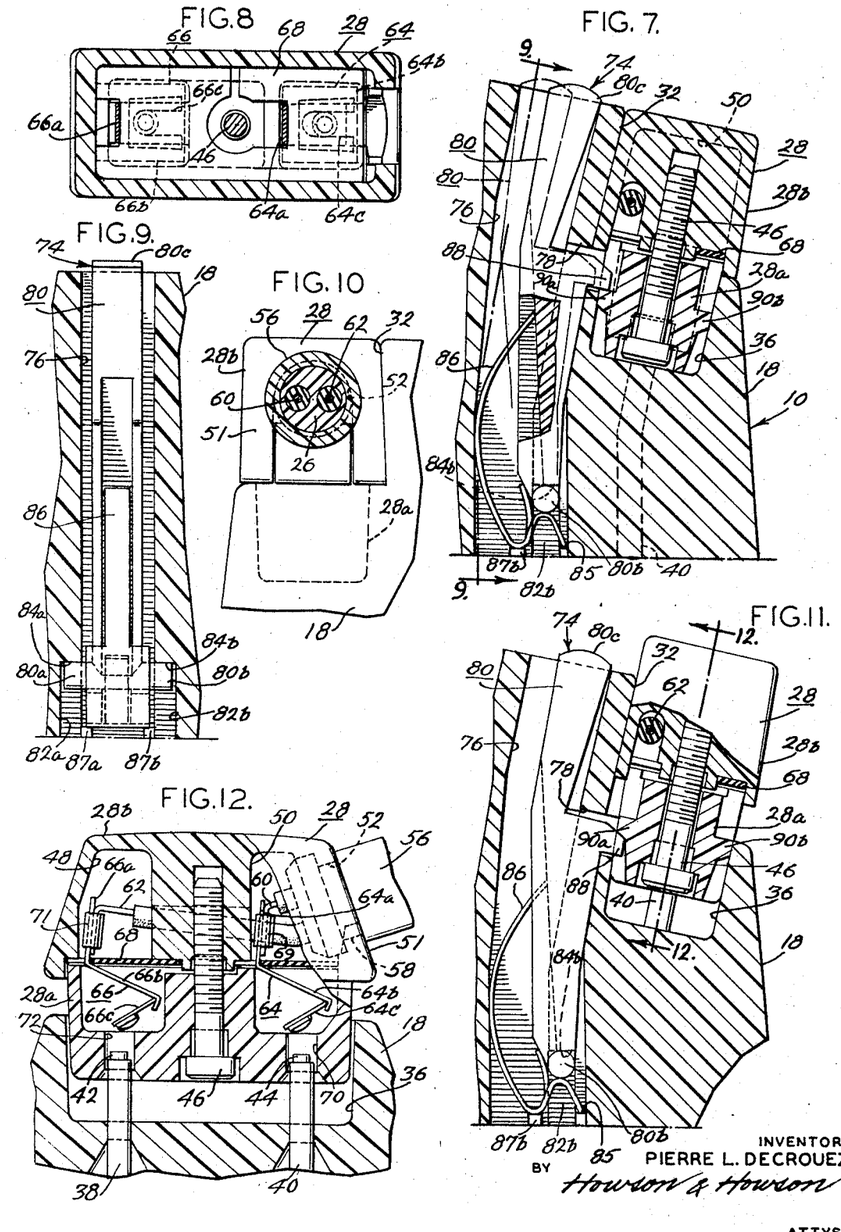
FIG. 7 is a fragmentary sectional view of the latch means showing the latch in alternative positions for holding and releasing the connector taken along line 7—7 of FIG. 4.
FIG. 8 is a sectional view of the connector taken along line 8—8 of FIG. 4.
FIG. 9 is a fragmentary sectional view of the latch means taken along line 9—9 of FIG. 7.
FIG. 10 is a sectional view of the ironing cord and guard taken along line 10—10 of FIG. 2.
FIG. 11 is a fragmentary side elevational view, partially in section, similar to FIG. 7, showing the connector in its released position above the latch.
FIG. 12 is a fragmentary sectional view taken along line 12—12 of FIG. 11.

Electric cord 26 extends through an opening 52 in side 51 of the connector and into the compartment 50, as seen in FIGS. 4 and 10. A guard 56 is provided to surround and grip the cord and extends with the cord through opening 52 at a reduced diameter collar portion 58 of the guard. The guard 56 around the cord acts as a strain relief member to grip the cord and hold the cord fixed to the connector, thereby preventing wires of the cord from being pulled free of the connector.

As can be seen in FIGS. 4 and 12, the cord with electrical wires 60 and 62 extends through opening 52 into compartment 50 and wire 62 extends into compartment 48 through an opening in the web between compartments 48 and 50. Wire 60 in compartment 50 is connected to one leg 64a of terminal element 64 and wire 62 in compartment 48 is connected to one leg 66a of terminal element 66. Terminal elements 64 and 66, as shown in FIGS. 4, 5 and 6, are each formed by a stamping of sheet spring metal such as beryllium copper cut and bent to desired form. The terminal elements are legs 64a and 64b and 66a and 66b, respectively, bent at an angle of somewhat greater than 90° to one another and each element is supported within the connector at the bend by an insulating deck 68 of fiber board clamped between parts of the top and bottom portions of the connector.

More specifically, the I-shaped legs 64a and 66a have the respective wires 60 and 62 connected thereto by strips of sheet metal 69 and 71, respectively, such as soft brass, crimped around the legs to hold the wires against and in good electrical contact with the respective terminal elements. Terminal element 66, as shown in FIG. 6, and terminal element 64 which is like it, have contact supporting arms 64c and 66c, respectively, cut out of legs 64b and 66b, respectively. Contact supporting arm 66c is a peninsular-like projection extending into a window in leg 66b, for example, the support for arm 66c being at the end of leg 66b remote from leg 66a. The contact arms are bent out of the plane of the legs 64b and 66b and extend downwardly toward openings 70 and 72 in the bottom of compartments 50 and 48, respectively. The lower side of the free end of each contact supporting arm has a precious metal contact point attached to it. Each of the contacts are positioned to abut terminal posts 38 and 40, respectively, when the connector is positioned within socket 32, as shown in FIG. 4. The precious metal contact points are preferably employed to provide superior metals at the contact points to provide repeatedly good contact and to prevent pitting and spark erosion. The contact arms and the rest of the terminal elements 64 and 66 are composed of spring material and arranged so that they are resilient to compress after the first contact between terminals 38 and 40 and contact arms 64c and 66c, respectively, as the connector plug is pushed into the socket. The energy thus stored in the spring contact arms tends resiliently to urge the connector out of the socket when the connector is unlatched from the handle, as will be described hereinafter. By having each of the terminal elements 64 and 66 bent to provide legs 64b and 66b, respectively, and arms 64c and 66c, respectively, the stresses created in compressing the elements are distributed over two areas to provide the desired distance of vertical movement and spring action. For example, arm 66c may bend relative to leg 66b, and leg 66b may bend relative to leg 66a. In this manner the desired degree of flexing of each terminal element is attained without permanently deforming it and at the same time allowing for greater tolerances in manufacturing the relative parts. While the spring and conductor functions of the resilient contact arms may be separated, they are preferably consolidated. Compression of the contacts of the connector and terminal posts also tends to improve the electrical contact.

Since the connector is not attached to the iron handle by a conventional frictionally held plug-type arrangement, the present invention employs latch means generally designated 74 to cooperate with the connector to hold it releasably fixed to the handle when the connector is in position so that the contact arms 64c and 66c are biased against the terminal posts of the heating element.

More particularly, as seen in FIGS. 3, 7, 9 and 11, a cavity 76 is provided through the rear leg, opening at the top and bottom of the rear leg forward of socket 32. A passage 78 is provided through the wall between cavity 76 and cavity 36 of the socket. A latch lever 80 is located in generally vertical orientation within the cavity 76 with one end extending slightly above the top of rear leg 24. The other end of latch lever 80 is provided with aligned outwardly extended trunnions 80a and 80b.

In assembly the latch lever 80 is inserted into cavity 76 through the bottom until the trunnions abut against the shoulders 84a and 84b at the tops of recess 82a and 82b on opposite sides of cavity 76 adjacent the socket (see FIG. 9) in which position the top of the lever is exposed so that its top provides a finger actuator portion 80c for rotating the latch lever pivotally in the cavity about the trunnions. The cavity 76 is extended laterally by the recesses 82a and 82b which accommodate the trunnions 80a and 80b which are held in position by being urged upwardly against shoulders 84a and 84b defining the upper end of recesses 82a and 82b by a portion of leaf spring 86. This leaf spring is divided at its bottom end into two parts bent into a predetermined irregular shape and inserted through the bottom opening of the cavity. The divided parts are arranged respectively to bear against the trunnions upwardly and laterally thereby retaining the trunnions in the recesses 82a and 82b against the shoulders 84a and 84b and the back wall of the cavity. In order to hold leaf spring 86 in position, a suitable shoulder 85 and ribs 87a and 87b prevent downward movement once the bottom end of the spring has passed shoulder 85. The upper end of the spring extends between the forward wall of the cavity and the lever and bears against each to provide lateral force and stability to the lower end of the spring and to urge the lever away from the forward wall, as shown in FIGS. 3 and 11. The leaf spring once snapped into position in cavity 76 is resiliently wedged in position laterally between the front and back walls of the cavity and the latch lever and vertically between shoulder 85, ribs 87a and 87b and the trunnions. In this arrangement the lever may be pivoted about its trunnions in a predetermined manner and is urged against the back wall of the cavity adjacent the socket.

In order to hold the connector fixed in the socket, lever 80 is provided with an integral rearwardly extending keeper 88 which is adapted to extend rearwardly through passage 78 and a distance into socket 32, as shown in FIGS. 3 and 11. The lower surface of the keeper provides the latch for engaging an abutting portion of the connector to releasably hold the connector fixed in the socket. The upper surface of the keeper is beveled to provide a camming surface so that the keeper and lever will be urged away from the socket by the connector as it is pushed into the socket. Preferably and alternatively, the cooperating portion of the connector housing has a beveled camming surface which aids in the action moving the keeper and its supporting lever aside.

The opposite side of the keeper by contrast provides a shoulder which cooperates with a shoulder on the connector when fully inserted into the socket to return the connector in the socket. In the arrangement of FIGS. 3, 7 and 11, the connector is provided with identical laterally projecting ribs 90a and 90b on opposite sides of the connector, only one of which is effective at a time. The bottom surface of each rib provides the beveled camming surface and the top surface of each rib provides the latch surface. As the connector is inserted into the socket the cam on the bottom of rib 90a in cooperation with the keeper cam drives the keeper 88 laterally aside from the position seen in full lines in FIG. 11 to the position in phantom in FIG. 7. Once the rib is passed the leaf spring 86 drives lever 80 and its keeper back to the full line position of FIG. 7. In this position the opposed shoulders of keeper 88 and rib 90a hold the connector in place until the lever is manually moved by use of finger piece 80c.

The connector is easily removed from the socket by moving the finger actuator portion 80c of the lever forward to move the keeper along a predetermined path, as shown in the alternative position of the lever in FIG. 7, until the keeper is free of the rib of the connector so that the connector will automatically be urged out of the socket by spring action as the stored energy is dissipated from the compressed terminal elements. Upon release of the finger actuator portion of the lever, the cam surface of the keeper is engageable with the camming surface of the rib 90a so that even though the connector remains in the socket, the contacts of the connector are out of engagement with the terminals of the heating element, as shown in FIGS. 11 and 12. In this position the connector can easily be lifted from the socket.

FIGS. 13 through 17 illustrate an alternative form of the rear leg, connector and latch means for the iron of FIGS. 1 and 2. The parts shown in FIGS. 13 through 17 are similar in many respects to parts shown in FIGS. 3 through 11. In the present instance, connector 100 has a plug portion 100a which is received in a socket 102 formed in rear leg 104 in the course of molding the handle providing an opening just below the top of the rear leg. The socket is adapted to receive the mating plug portion of the connector and the connector positioned in the socket is designed to complete the smooth contour of the handle, a portion of the handle having been omitted in forming the socket and being provided by the connector. Socket 102 comprises an upwardly opening cavity 106 extending across the width of rear leg 104, the sidewalls of cavity 106 serving to guide the plug portion of the connector into the socket. The bottom of the socket is closed except for openings which permit upwardly extending terminal posts 108 and 109 attached to the ends of the heating element to enter the cavity from hollow portions of the rear leg below the bottom of the cavity. The terminal posts extend upwardly into cavity 106 and are surmounted by precious metal contact points.

Figures 14, 15, 17:
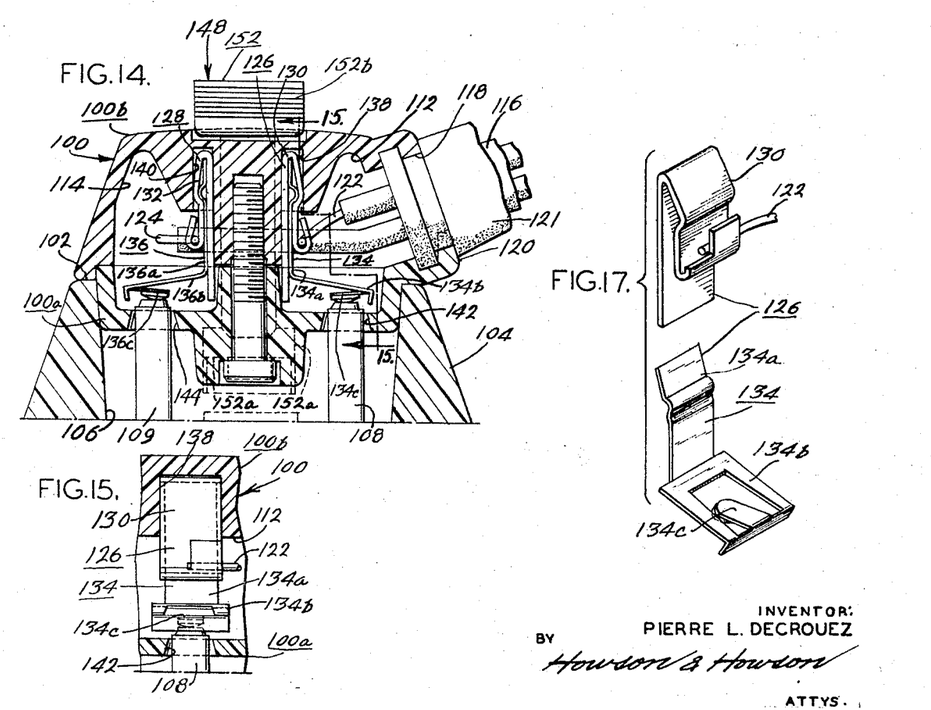
FIG. 14 is a sectional view taken along line 14—14 of FIG. 13.
FIG. 15 is a fragmentary sectional view taken along line 15—15 of FIG. 14.
FIG. 17 is an exploded perspective view of the terminal element with its resilient contact arm of FIG. 15.

Connector 100 is composed of a two-piece unit of molded resinous material comprising a top inverted trough-shaped portion desigated 100b and bottom trough-shaped plug portion designated 100a of reduced cross section dimensions to fit within the sidewalls of the top portion. The top and bottom of the connector each have a vertically oriented central web which is aligned with the other to divide the connector into compartments 112 and 114, as shown in FIG 14. The top and bottom portions of the connector are made to fit together with the bottom being snugly received within the top and abutting a shoulder so that any convenient means such as a self-threading screw may be used to hold them together.

An electric cord 116 extends through an opening 118 in side 120 of the connector and into compartment 112 and a guard 121 is provided to surround and grip the cord and extends with the cord through opening 118 at a reduced diameter collar portion of the guard. The guard grips the cord and holds it fixed to the connector. Wires 122 and 124 extend into compartment 112 and wire 124 extends into compartment 114 through an opening in the web between compartments 112 and 114. Wire 122 in compartment 112 is connected to terminal element 126 and wire 124 in compartment 114 is connected to terminal element 128. Terminal elements 126 and 128 are each formed by a stamping of sheet metal and are bent to desired form. Each of the terminal elements 126 and 128 is of a two-piece unit having a first roughly S-shaped piece 130 and 132, respectively, of sheet metal with one end tab crimped against its central portions to hold an interposed wire at one bend. The second spring metal pieces 134 and 136 are composed of legs 134a and 136a and 134b and 136b, respectively, bent at an angle somewhat greater than 90° to one another. As seen in FIG. 17, leg 134a is placed between the longer legs of piece 130 to extend upwardly as seen in FIG. 14 to the second bend of the S-shaped piece with suitable mating ridges on the two pieces to hold them in proper relative position. The two pieces of terminal element 128 are fitted together in the same manner as described in regard to terminal element 126. The terminal elements are each supported within the connector in slots 138 and 140, respectively, on opposite sides of the central web in top portion 100b adjacent the top thereof. The S-shaped pieces 130 and 132 of the terminal elements are wedged into slots 138 and 140, respectively, with legs 134a and 136a of the second pieces held in the slots in a manner to have legs 134b and 136b extending downwardly and outwardly into compartments 112 and 114, respectively, as shown in FIG. 14.

Figures 13, 16:
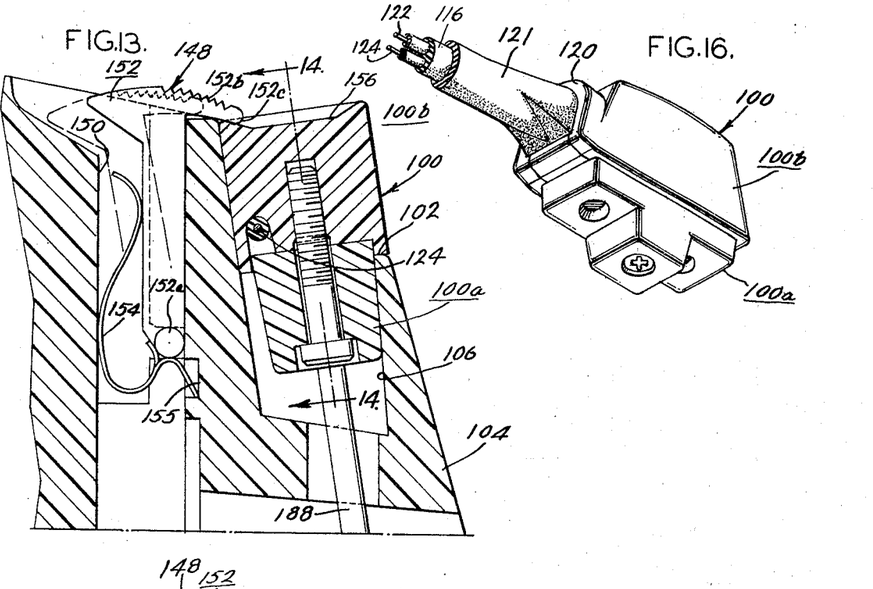
FIG. 13 is a side elevational view, partially in section, showing an alternative form of the latch means and connector and showing the latch in alternative positions for holding and releasing the connector.
FIG. 16 is a perspective view of the connector of FIG. 13.

Terminal elements 126 and 128 have contact supporting arms 134c and 136c, respectively, cut out of legs 134b and 136b, respectively. Contact supporting arm 134c, and contact supporting arm 136c which is like it, is a peninsular-like projection extending into a window in leg 134b, the support for arm 134c being at the end of leg 134b remote from leg 134a. The contact supporting arms are bent out of the plane of legs 134b and 136b and extend downwardly toward openings 142 and 144 in the bottom of compartments 112 and 114, respectively. The lower side of the free end of each contact supporting arm has a precious metal contact point attached to it by any convenient means. The contact points on contact arms 134c and 136c are positioned to contact terminal posts 108 and 109, respectively, when the connector is positioned within the socket as shown in FIG. 14. In a manner similar to that described in regard to the connector of FIG. 4, the contact arms of the connector in the present instance are composed of spring metal and are arranged so that they are compressed after the first contact between the terminal posts 108 and 109 and contact arms 134c and 136c, respectively, as the connector is positioned in the socket. The energy stored by the compression of the terminal elements tends resiliently to urge the connector out of the socket when the connector is held in the socket by latch means 148 as shown in FIG. 13. Each of the terminal elements 134 and 136 of FIG. 14, in a manner similar to the terminal elements of FIG. 4, provides the desired distance of bending and spring action by being bent to provide legs 134b and 136b, respectively, and arms 134c and 136c, respectively.

In this embodiment of the invention of FIG. 13, the latch means cooperating with the connector to hold it releasably fixed to the handle is somewhat different from the latch means described in the embodiment of FIG. 3. A cavity 150 is provided through the length of the rear leg, opening at the top and bottom of the rear leg forward of the socket 102. A latch lever 152 is located in generally vertical orientation within the cavity with one end extending above the top of rear leg 104. The other end of latch lever 152 is provided with aligned outwardly extending trunnions generally designated 152a. In assembly, the latch lever is inserted into cavity 150 which is T-shaped in cross section through the top until the trunnions can be moved laterally to underlie shoulders terminating the tops of the recesses on opposite sides of the cavity which make the cavity below the shoulders generally rectangular in cross section. With the trunnions moved beneath the shoulder, the top of the lever is exposed so that its top provides a serrated finger actuator 152b for rotating the lever pivotally in the cavity about the trunnions.

The latch lever is held in cavity 150 with the trunnions fixed beneath the shoulders by a leaf spring 154 whose lower end is divided into two parts and which is bent into an irregular shape. The spring is inserted through the bottom opening and is pushed up into the cavity to bear against the latch lever and its trunnions both upwardly until the lower end of the spring snaps into a recess 155 and against a terminating lower shoulder of recess 155. In this position the separate ports of the lower end laterally force the trunnions into the recesses against the back wall and upwardly against the shoulder, respectively. The leaf spring from the divided portion reverses from its downward direction and extends upwardly and against the forward wall of the cavity and back across the cavity against the lever to urge the lever against the back wall of the cavity adjacent the socket.

In order to hold the connector fixed in position in the socket, the actuator portion 152b above the rear leg provides a keeper 152c which extends rearwardly beyond the iron handle and over the socket. Keeper or latch 152c therefore will overlie the top of the connector to hold it in the socket against the urging of the compressed terminal elements. In the present instance, the top surface of top portion 100b of the connector is molded with a shallow trough 156 having gradually sloping sidewalls providing a catch portion alternatively engageable by the keeper. The underside of the keeper is gradually arced to provide a camming surface which engages the sides of the trough which are at a slightly different angle to provide a wedging action forcing the connector downwardly into the socket to firmly seat the connector in the socket with its terminal elements compressed against the terminals of the heating element, as shown in FIG. 14.

As the connector is positioned in the socket it may be moved against the rearward end of the keeper to pivot the keeper and lever away from the socket so that the connector may be inserted in the socket past the keeper. After the top of the connector has moved below the keeper, the catch provided by the sides of the trough will be automatically engaged by the keeper which is biased into the socket thereby firmly seating and holding the connector in the socket.

The connector may be easily removed from the socket by pressing the finger piece toward the front of the iron to move the keeper along a predetermined path until the keeper is free of the top portion of the connector, at which time the spring energy stored in the compressed terminal elements will move the connector upwardly in the socket. With the connector in this position if the lever is released the keeper will only move against the side of the connector and not latch such that the connector may be easily lifted from the socket.

Figures 18, 19, 20, 21, 22:
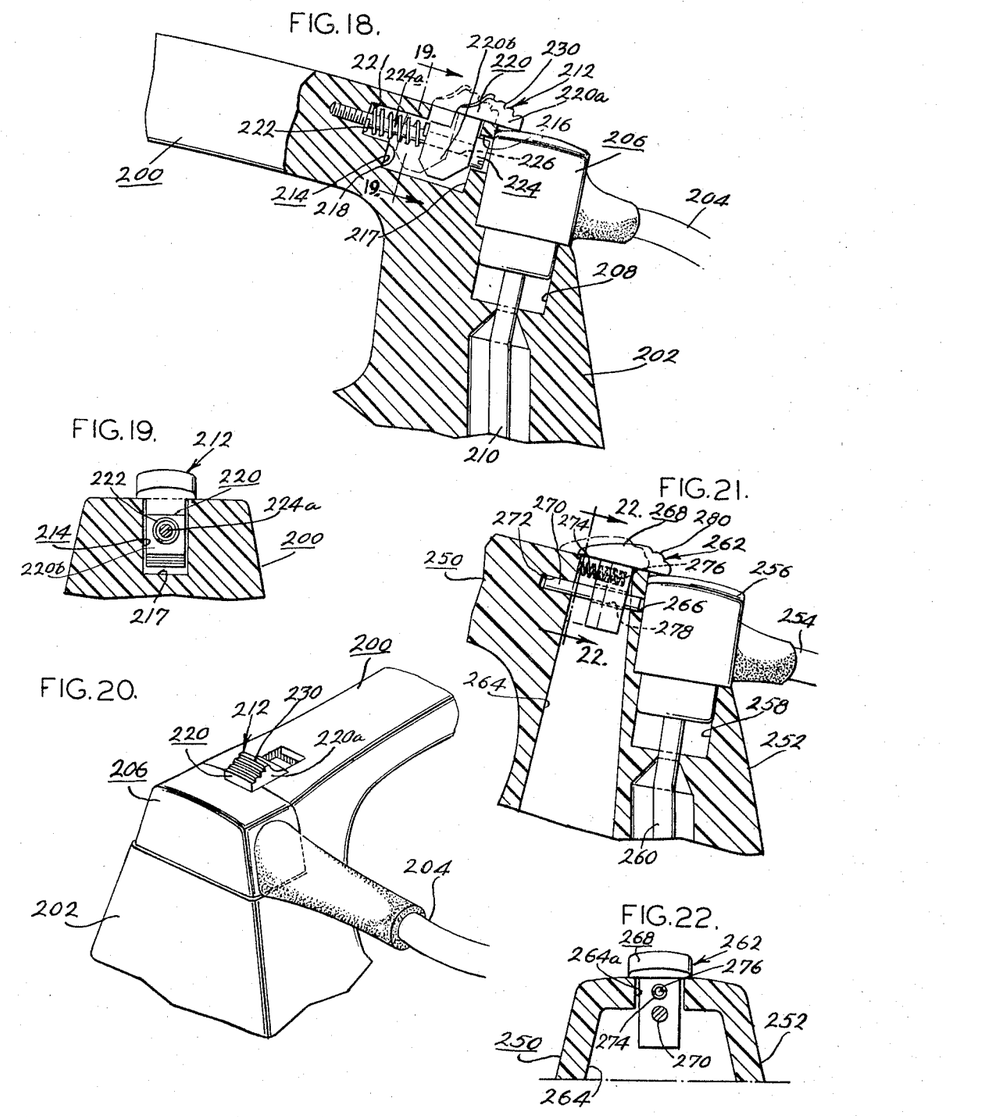
FIG. 18 is a fragmentary side elevational view, partially in section, showing another form of the latch means and connector and showing the latch in alternative positions for holding and releasing the connector.
FIG. 19 is a fragmentary sectional view taken along line 19—19 of FIG. 18.
FIG. 20 is a fragmentary perspective view of the latch means and connector of FIG. 18.
FIG. 21 is a fragmentary side elevational view, partially in section, showing another form of the latch means and connector and showing the latch in alternative positions for holding and releasing the connector.
FIG. 22 is a fragmentary sectional view taken along line 22—22 of FIG. 21.

Referring to FIGS. 18 through 20, another embodiment of the latch means in accordance with the present invention is shown. There is shown a handle 200 having a rear leg 202 which may be used with the iron of FIGS. 1 and 2. An electric cord 204 is provided for supplying electrical current to the heating element of the iron and is connected to the iron by a connector generally designated 206 received in a socket 208 in the rear leg. The connector is suitable for being removed from the iron and reversed in position in socket 208 to cause the cord to extend selectively to either side of the rear leg. The connector of FIGS. 18 and 20 is similar to the connector of FIGS. 3 and 4, except that the rib catch member provided on opposite sides of the connector of FIG. 3 is eliminated. The socket 208 illustrated in FIG. 18 is similar to the socket of FIG. 3 and has upwardly extending terminal posts generally designated 210 of a heating element (not shown) extending into the socket, as described in regard to the socket of FIG. 3. The primary difference in structure of FIG. 18 from that of FIG. 3 is in latch means 212 for holding the connector releasably fixed in the socket, as will now be described.

As can be seen in FIGS. 18 and 19, a cavity 214 is provided in the rear leg opening at the top of the rear leg forward of socket 208. A passage 216 is provided through the wall between socket 208 and cavity 214. The cavity 214 comprises a shallow well 217 opening at the top of the rear leg and an undercut portion 218 extending from the shallow well a distance in the handle toward the front of the iron. A latch slide 220 is employed which is T-shaped in vertical cross section with the tongue of the T extending into the cavity and the cross bar of the T extending beyond the sides of the cavity and overlapping the top of rear leg 202. Latch slide 220 slides on a rod 224a along a predetermined path in the cavity provided by the shank of lengthwise extending screw 224 which is threaded into the handle at the end of a bore 221 extending the undercut forward. Helical spring 222 surrounds the rod 224a and extends from the end wall terminating the bore through the undercut into contact with a portion 220b of the slide urging the slide toward the rear of the iron.

In assembly of the latch means, helical spring 222 is inserted into the bore 221 extending the undercut portion and the latch slide is inserted into the cavity with portion 220b abutting against the rearward end of the helical spring. Screw 224 is inserted through passage 216, through an opening 226 in the slide and through helical spring and threaded into the handle forward of the undercut portion of the cavity.

The upper surface 220a of the slide, which extends through the opening to the cavity, provides a serrated finger actuator portion 230 for moving the slide along the guide screw toward the front of the iron. The finger actuator portion 230 of the slide also extends rearwardly over the wall separating the cavity and socket and a distance above the socket to provide a keeper to overlie a portion of connector 206 which is seated in the socket generally flush with the top of the handle. When the connector is positioned in the socket, the keeper is spring urged rearwardly to overlie and hold the connector in the socket against the urging of the compressed terminal elements contacting the terminals of the heating element. When the connector is in this position in the socket, the slide is positioned along the top of the handle so that the keeper is directed downward at a slight acute angle to the top abutting surface of the connector as shown in FIG. 18, to provide a camming action to firmly seat the connector in the socket with its terminal elements compressed against the terminals of the heating element. By having the keeper contact the top surface of the connector at an acute angle, good camming action is provided while allowing for greater tolerances in making the connector, rear leg and latch slide. In this arrangement, for example, if the connector seats slightly higher in the socket, the keeper will still engage the top surface of the connector but slightly closer to the wall separating the socket and cavity.

The connector is easily positioned in the socket by either manually moving the side or pushing the slide out of the way with the connector as the connector is inserted into the socket. When the top of the connector has moved below the keeper of the slide, the slide will then be moved by the helical spring to overlie the top surface of the connector holding the connector firmly in the socket against the urging of the compressed terminal elements.

In order to remove the connector from the socket, it is only necessary for the finger actuator portion to be moved forward moving the slide along the guide screw until the keeper is free of the top surface of the connector whereby the connector will be automatically urged upwardly in the socket through the compressed terminal elements having their stored energy dissipated. In this position of the connector in the socket, the finger actuator portion of the slide may be released to have the keeper engage the side of the connector to hold the connector up in the socket such that it may be easily lifted from the socket.

FIGS. 21 and 22 illustrate another embodiment of the latch means in accordance with the present invention. There is shown a handle 250 having a rear leg 252 which may be used with the electric iron of FIGS. 1 and 2. An electric cord 254 is provided for supplying electrical ground to the heating element of the iron and is connected to the iron by a connector generally designated 256 received in a socket 258 in the rear leg. The connector is suitable for being removed from the iron and reversed in position in the socket to cause the cord to extend selectively to either side of the rear leg. The connector of FIG. 21 is simialr to the connector of FIG. 18. The socket 258 illustrated in FIG. 21 is similar to the sockets of FIG. 18 and has upwardly extending terminal posts generally designated 260 of a heating element (not shown) extending into the socket. The primary difference in structure of FIG. 21 from that of FIG. 18 is in latch means 262 for holding the connector releasably fixed in the socket, as will now be described.

As can be seen in FIG. 21, a cavity 264 is provided through the length of the rear leg, opening at the top and bottom of the rear leg forward of the socket 258. The opening of the cavity at the top of the rear leg is reduced in cross section so as to provide a longitudinally extending slot 264a opening at the top of the rear leg. The cavity 264 is made wider in cross section beneath the top of the handle, as shown in FIG. 22, than the cavity shown in FIG. 9 in order to use less resinous material, for example, in molding the handle. A pasasge 266 is provided through the wall between socket 258 and cavity 264. A latch slide 268 is employed which is T-shaped in vertical cross section with the tongue of the T extending into the cavity and the cross bar of the T extending beyond the sides of the cavity and overlapping the top of the rear leg 252. Latch slide 268 slides on a pin 270 in the cavity which extends lengthwise of the handle and is held in a bore 272 extending from the cavity forward in the handle. A helical spring 274 is fitted within a bore 276 extending into the slide from the forward portion of the tongue. The helical spring extends from the bore in the slide into contact with the forward wall of the cavity urging the slide toward the rear of the cavity adjacent the socket.

In assembly of the latch means, the helical spring 274 is inserted into the bore 276 in the slide and the latch slide is inserted into the cavity through the top thereof to have the spring at its free end abut against the forward wall of the cavity. Pin 270 is inserted through passage 266, through an opening 278 in the slide and is snugly received in bore 272 in the handle forward of the cavity.

The cross bar of the T-shaped slide, which overlaps the top of rear leg 252, provides a finger actuator portion 280 for moving the slide along the guide pin 276 toward the front of the iron. Finger actuator portion 280 of the slide extends rearwardly across the wall separating the cavity and socket and a distance above the socket to provide a keeper to overlie a portion of the connector. With the connector positioned in the socket the keeper is urged by spring 274 rearwardly along a predetermined path to overlie and hold the connector in the socket against the urging of the compressed terminal elements contacting the terminals of the heating element. In this position of the connector in the socket, the slide is positioned relative to the handle so that the keeper is directed downward at a slight acute angle to the top surface of the connector to firmly sit the connector in the socket. The arrangement of the slide camming against the top surface of the connector, in a manner similar to the arrangement of FIG. 18, enables greater tolerances in making the connector, rear leg and latch slide by having the keeper contact the top surface of the connector at an angle and a distance from the side of the connector adjacent the wall separating the socket and cavity, as shown in FIG. 21.

It will be appreciated by those skilled in the art that the connector arrangement of the present invention provides many advantages over the prior art ironing cord connector arrangements in that a novel connector is provided which is easily and simply attached to the iron and easily releasable therefrom. The connector can be easily reversed in the socket in the handle for selectively extending the cord to either side of the handle as desired by the user.

Moreover, the connector and electric cord can be easily replaced if, for example, the cord becomes frayed or split, without the need for breaking a permanent electric connection of the cord to the iron. Also, when the latch means is released, the compressed resilient contact arms of the connector automatically move the connector upwardly in the socket so that it may be easily and quickly removed from the socket. It will be seen that the connector and latch means of the present invention provide a simple and inexpensive structure which may be easily assembled and is capable of trouble-free operation and long life without replacement.

While the invention has been described with particular reference to specific embodiments thereof in the interest of complete definiteness, it will be understood that it may be embodied in a large variety of forms different from the ones specifically shown and described without departing from the scope and spirit of the invention as defined by the appended claims.

I claim:

1. An electric iron having a body portion provided with an electric resistance heating element having a pair of electrical terminals, which comprises: a handle for said iron having a socket therein; said terminals of said heating elements extending into said socket; an electric cord having a pair of wires for supplying electrical current to said heating element; a connector into which said cord extends and which is alternatively positionable in said socket such that said cord will extend to one side or the other of said handle; a pair of electrical terminal means supported by said connector, each connected to a different one of said wires such that when said connector is positioned in said socket each of said terminal means contacts one of said terminals of said heating element and releasable latch means supported by said handle and movable along a predetermined path irrespective of the orientation of said connector in said socket, said latch means being resiliently urged into a position to engage a portion of said connector to hold said connector fixed in said socket when said connector is positioned in said socket, whereby when said latch means is released said connector may be removed from said socket and reversed to cause said cord to extend to the opposite side of said handle.

2. The electric iron of claim 1 in which said connector is provided with a surface and said latch means is directed at an angle to the surface of said connector to provide a camming action to firmly seat said connector in said socket.

3. An electric iron having a body portion provided with an electric resistance heating element having a pair of electrical terminals, which comprises: a handle for said iron having a socket therein; said terminals of said heating element extending into said socket; an electric cord having a pair of wires for supplying electrical current to said heating element; a connector into which said cord extends and which is alternatively positionable in said socket such that said cord will extend to one side or the other of said handle; a pair of electrical terminal means supported by said connector, each connected to a different one of said wires such that when said connector is positioned in said socket each of said terminal means contacts one of said terminals of said heating element; releasable latch means supported by said handle and resiliently urged into a position to engage a portion of said connector to hold said connector fixed in said socket when said connector is positioned in said socket; and resilient means is provided on at least one of the interengagable members, said resilient means being deformed when said connector is positioned in said socket and tending to urge said connector out of said socket, said latch means being arranged to oppose the urging of said resilient means, whereby said connector may be removed from said socket and reversed to cause said cord to extend to the opposite side of said handle.

4. The electric iron of claim 3 in which said resilient means is associated with said terminal means in said connector.

5. An electric iron having a body portion provided with an electric resistance heating element having a pair of electrical terminals, which comprises: a handle for said iron having a socket therein; said terminals of said heating element extending into said socket; an electric cord having a pair of wires for supplying electrical current to said heating element; a connector into which said cord extends and which is alternatively positionable in said socoket such that said cord will extend to one side or the other of said handle; a pair of electrical terminal means supported by said connector, each connected to a different one of said wires such that when said connector is positioned in said socket each of said terminal means contacts one of said terminals of said heating element; and releasable latch means supported by said handle and resiliently urged into a position to engage a portion of said connector to hold said connector fixed in said socket when said connector is positioned in said socket; said terminal means each comprises a contact element having an electrically conducting and resilient contact arm positioned to contact one of said terminals of said heating element and to resist positioning said connector in said socket such that when said latch means is released said contact arms will urge said connector out of said socket, whereby said connector may be removed from said socket and reversed to cause said cord to extend to the opposite side of said handle.

6. The electric iron of claim 5 in which said releasable latch means comprises a latch member movably supported by said handle and a spring supported by said handle to bias said latch member toward said socket, said latch member being adapted to releasably hold said connector fixed to said handle when said connector is positioned in said socket.

7. The electric iron of claim 6 in which said handle has a cavity therein located adjacent said socket and said latch member is pivotally supported in said cavity, said latch member being biased into said socket in overlapping relation to said portion of said connector when said connector is positioned in said socket.

8. The electric iron of claim 5 in which said handle has a cavity therein interconnected with said socket and said releasable latch means comprises a lever pivotally supported in said cavity and a leaf spring supported in said cavity to bias said lever toward said socket, said lever including a keeper extending into said socket through said interconnection to overlie a portion of said connector when the connector is inserted in the socket to releasably hold said connector fixed in said socket.

9. The electric iron of claim 8 in which said portion of said connector which first contacts said keeper and said keeper are provided with mutually cooperating cam surfaces to permit passage of said connector into said socket by moving said lever against the bias of said leaf spring.

10. The electric iron of claim 8 in which said keeper is provided with guard means which functions tn hold said connector from electrically contacting said terminals of said heating element after said lever is released and said connector is moved in said socket by said resilient contact arms.

11. The electric iron of claim 5 in which said releasable latch means comprises a latch member supported by said handle and a spring supported by said handle biasing said latch member toward said socket, said latch member including a keeper extending outwardly from said handle and in overlying relation with said connector in said socket so that said keeper will engage a surface of said connector to hold said connector releasably fixed to said handle.

12. The electric iron of claim 11 in which said handle has a cavity therein and said latch member comprises a lever pivotally supported in said cavity and extending outwardly from said handle to provide said keeper positionable to hold said connector releasable fixed to said handle, said spring being a leaf spring supported in said cavity biasing said lever toward said socket so that said keeper is engagable with said connector.

13. The electric iron of claim 11 in which said latch member comprises a slide supported by said handle, said slide providing said keeper engagable with said connector when said connector is positioned in said socket, said spring comprises a helical spring supported by said handle to bias said slide toward said socket.

14. The electric iron of claim 11 in which said handle has a cavity therein and said latch member comprises a slide movably supported in said cavity and extending outwardly from said handle to provide said keeper engagable with said surface of said connector, said spring comprises a helical spring supported in said cavity to bias said slide toward said socket.

15. The electric iron of claim 14 in which said connector has a top surface which is engaged by said keeper, and said slide is positioned so that said keeper is directed downwardly at an angle to said top surface of said connector to provide a camming action to firmly seat said connector in said socket.

16. An electric iron having a body portion provided with an electric resistance heating element having a pair of electrical terminals, which comprises: a handle for said iron having a socket therein; said terminals of said heating element extending into said socket; an electric cord having a pair of wires for supplying electrical current to said heating element; a connector into which said cord extends and which is alternatively positionable in said socket such that said cord will extend to one side or the other of said handle; a pair of electrical terminal means supported by said connector, each connected to a different one of said wires such that when said connector is positioned in said socket each of said terminal means contacts one of said terminals of said heating element; said terminal means each comprises a sheet of metal including a first portion supported by said connector, and a second portion bent at an angle to said first portion and having a plurality of sections bent at angles to one another to provide a resilient contact arm positioned to contact one of said terminals of said heating element and releasable latch means supported by said handle and resiliently urged into a position to engage a portion of said connector to hold connector fixed in said socket when said connector is positioned in said socket, whereby when said latch means is released said terminal means will urge said connector out of said socket and said connector may be removed from said socket and reversed to cause said cord to extend to the opposite side of said handle.

17. An electric iron having a body portion provided with an electric resistance heating element having a pair of electrical terminals, which comprises: a handle for said iron having a socket therein; said terminals of said heating element extending into said socket; an electric cord having a pair of wires for supplying electrical current to said heating element; an elongated guard extending a distance along said cord and gripping said cord; a connector into which said cord extends and adapted to hold said guard fixed to said connector; said connector being alternatively positionable in said socket such that said cord will extend to one side or the other of said handle; a pair of terminal elements supported by said connector, each connected to a different one of said wires; each of said terminal elements having an electrically conducting and resilient contact arm positioned to contact one of said terminals of said heating element and to resist positioning said connector in said socket, and releasable latch means supported by said handle and resiliently urged into a position to engage a portion of said connector to hold said connector positioned in said socket against the bias of said contact arms, whereby when said latch means is released said resilient contact arms will urge said connector out of said socket.

18. The electric iron of claim 1 in which said connector has a top portion and a bottom plug portion positionable in said socket, said latch means being urged to overlie said top portion of said connector when said connector is positioned in said socket.

References Cited

UNITED STATES PATENTS 2,416,984  3/1947  Farr ______________ 219—245
2,745,938  5/1956  Brandler ___________ 219—256

RICHARD M. WOOD, *Primary Examiner.*

C. L. ALBRITTON, *Assistant Examiner.*

U.S. Cl. X.R.

219—245